United States Patent [19]

Pfeiffer

[11] Patent Number: 5,119,230
[45] Date of Patent: Jun. 2, 1992

[54] OPTICAL FIBER COUPLER AMPLIFIER

[75] Inventor: Thomas Pfeiffer, Stuttgart, Fed. Rep. of Germany

[73] Assignee: Alcatel, N.V., Netherlands

[21] Appl. No.: 694,557

[22] Filed: May 2, 1991

[30] Foreign Application Priority Data

May 2, 1990 [DE] Fed. Rep. of Germany ....... 4014034

[51] Int. Cl.$^5$ .................. H01S 3/30; H01S 3/091; G02B 6/26
[52] U.S. Cl. .................. 359/341; 359/345; 372/6; 372/70; 385/27; 385/31; 385/42; 385/141
[58] Field of Search ............ 350/96.15, 96.29, 96.30, 350/96.34, 320; 372/6, 69, 70, 71; 385/27, 30, 31, 42, 49, 141; 359/341, 345

[56] References Cited

U.S. PATENT DOCUMENTS

| 4,546,476 | 10/1985 | Shaw et al. ................. 372/6 |
| 4,910,737 | 3/1990 | Payne et al. ................. 372/6 |
| 4,938,561 | 7/1990 | Grasso et al. ............... 372/6 X |
| 4,941,726 | 7/1990 | Russell et al. ............. 372/6 X |
| 4,959,837 | 9/1990 | Février et al. ............... 372/6 |
| 4,967,416 | 10/1990 | Esterowitz et al. ........... 372/6 |
| 5,005,175 | 4/1991 | Desurvire et al. ............ 372/6 |
| 5,027,079 | 6/1991 | Desurvire et al. .......... 372/6 X |
| 5,039,199 | 8/1991 | Mollenauer et al. ....... 385/31 X |
| 5,042,039 | 8/1991 | Edagawa et al. ............. 372/6 |
| 5,056,096 | 10/1991 | Baker et al. ................. 372/6 |
| 5,058,974 | 10/1991 | Mollenauer ................. 385/27 |
| 5,058,976 | 10/1991 | DiGiovanni et al. ...... 385/27 X |

FOREIGN PATENT DOCUMENTS

| 103382B1 | 3/1984 | European Pat. Off. ....... 372/6 X |
| 89/01002 | 3/1990 | PCT Int'l Appl. ........... 372/6 X |

OTHER PUBLICATIONS

"Low-Noise Erbium-Doped Fibre Amplifier Operating at 1.54 um", R. J. Mears, L. Reekie, I. M. Jauncey and D. N. Payne, *Electronics Letters*, vol. 23, No. 19, Sep. 10, 1987, pp. 1026–1028.

*Primary Examiner*—Brian Healy
*Attorney, Agent, or Firm*—Ware, Fressola, Van Der Sluys & Adolphson

[57] ABSTRACT

Conventional optical amplifiers for the amplification of optical signals propagating in an optical waveguide use a first light source for the production of pump light, by means of which an active laser substance is excited to a first energy level above its upper laser level. According to the invention, a second light source is used to excite the active laser substance to a second energy level that is above the first energy level. By doing so, spontaneous emission between the laser levels of the active laser substance is suppressed in favor of induced emission.

16 Claims, 1 Drawing Sheet

OPTICAL FIBER COUPLER AMPLIFIER

BACKGROUND OF THE INVENTION

1. Field of the Invention

The invention relates to an optical amplifier and a process for the amplification of an optical signal.

2. Description of the Prior Art

It is known to produce induced emission from active laser substance by means of optical pumps. In this process, the light source generating the pump light is selected such that its emission spectrum coincides with the absorption spectrum of the active laser substance. In the case of a suitable selection of the light source, the electrons of the active laser substance are excited to an energy state above the upper laser level. From this level, after a successful occupancy inversion, the substance relaxes, for example, by phonon emission to the upper laser level. From the upper laser level photons are emitted by induced emission if photons of an optical signal are present to produce an external radiation field. The active laser substance passes into the lower laser level which, in the case of the 3-level lasers, is the ground state. In the case of 4-level lasers, the active laser substance is converted from the lower laser level to the ground state by phonon emission.

An optical amplifier operating according to the principle of the 3-level laser is known from *Electronics Letters* 23 (1987) pp. 1026-1028.

An optical signal propagates in an optical waveguide, which is doped with a rare-earth compound, in this case with an erbium compound. The fiber amplifier contains a dye laser as a pump light source, whose light passes through a fiber coupler into the optical waveguide, where it induces the active laser substance to induce emission if light of the optical signal to be amplified passes through the optical waveguide.

In addition to the induced emission, during the return of the active laser substance to the lower state, there is also a spontaneous emission of photons, which causes a noise in the signal.

SUMMARY OF THE INVENTION

It is the task of the invention to create an optical amplifier of the above-mentioned type that reduces the noise content.

The problem is solved by providing an optical amplifier for amplifying an optical signal in an optical waveguide doped in at least one region with an active laser substance, wherein a first light source is provided for coupling a first pump light into the optical waveguide, and wherein the active laser substance is excitable by the first pump light to a first energy level above an upper laser level, characterized in that a second light source is provided for coupling a second pump light into the optical waveguide, with the active laser substance in the optical waveguide being excitable by the second pump light to a second energy level above the first energy level.

It is also an object of the invention to create a process for amplification of an optical signal by means of an optical amplifier. This object is achieved by a method of amplifying an optical signal in a first optical waveguide doped in at least one region with an active laser substance, with pump light being coupled through a coupler into the first optical waveguide and exciting the active laser substance to a first energy level above an upper laser level by absorption, characterized in that a second pump light enters the first optical waveguide and excites the active laser substance to a second energy level above the first energy level. A light signal amplified by this method contains distinctly less noise than a signal amplified in a conventional optical amplifier.

DESCRIPTION OF THE DRAWINGS

The invention will be explained by means of an embodiment according to the drawing. In this.

DETAILED DESCRIPTION OF THE INVENTION

An optical amplifier may be integrated on a substrate, in the same way as a first optical waveguide which is part of an optical communication system. An optical signal propagating in the optical waveguide is intensified by coupling of a first pump light into the optical amplifier. The light source necessary for this purpose may be also integrated on the substrate. A second light source for coupling of a second pump light may also be integrated into a substrate. From the light sources, the pump light is fed into the first optical waveguide via additional optical waveguides integrated on the substrate. The above-mentioned first optical waveguide is doped in the region of the optical amplifier with an active laser substance, which emits laser light when photons (for example, in the form of data bits) from the optical signal come into contact with the substance. Suitable active laser substances are, among others, the trivalent ions of rare-earth metals, e.g., erbium or neodymium ion, provided that the light emitted by these coincides with the wavelength of the optical signal.

Figure 1:
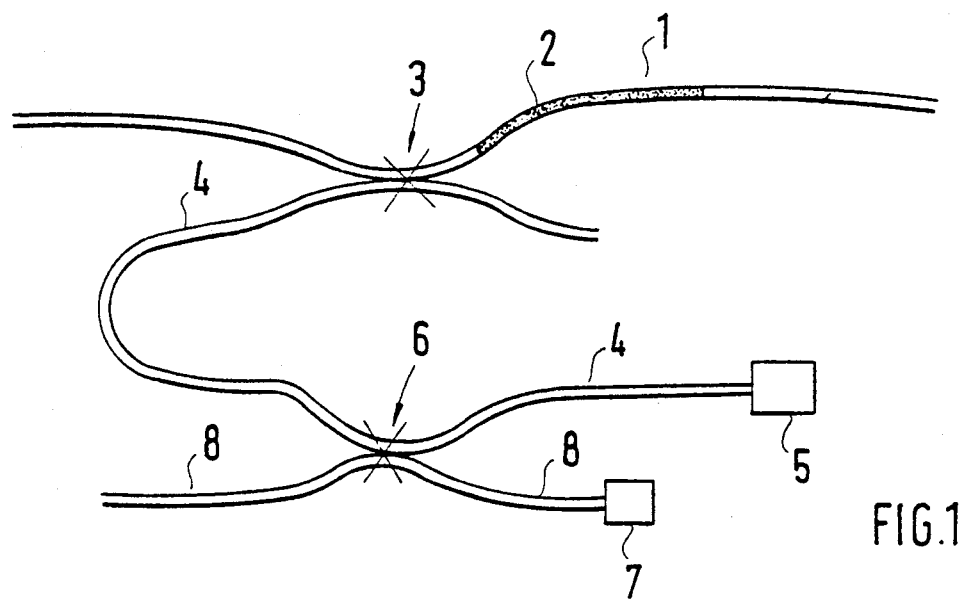
FIG. 1 shows an optical amplifier built into an optical fiber.

A fiber amplifier (FIG. 1) represents an optical amplifier not integrated on a substrate. In this case, the optical waveguides are in the form of optical fibers and the optical fiber 1, which is doped with an active laser substance 2 in one region, corresponds to the first optical waveguide. By means of a fiber-optic coupler 3, the optical fiber 1 is connected with an optical fiber 4, through which a pump light L1 is fed into the optical fiber 4 from a light source 5. The light source 5 is, for example, a laser, e.g., a dye laser.

In a fiber-optic coupler 6 a pump light L2 is fed from a light source 7, which can also be a laser, via an optical fiber 8 into the optical fiber 4. It then passes into the optical fiber 1 through the optical fiber 4.

Instead of feeding it through the optical fiber 4, the pump light L2 can also be fed into the optical fiber 1 directly via a fiber-optic coupler.

Figure 2:
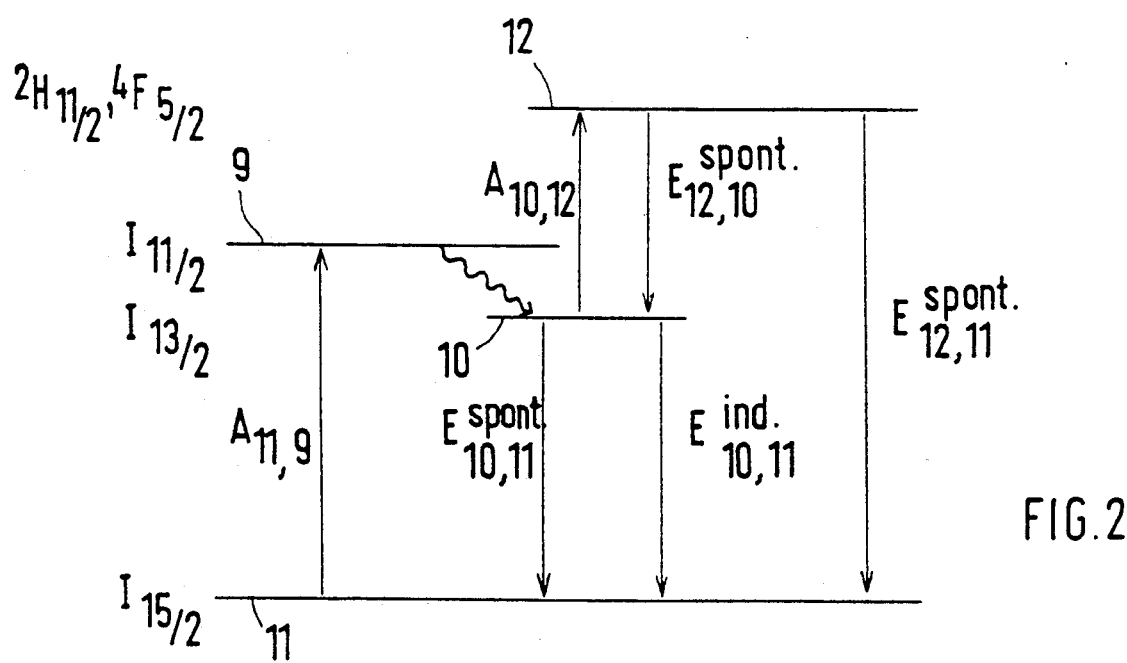
FIG. 2 shows a simplified level scheme of the trivalent erbium ion.

The optical fibers 4, 8 can also be connected jointly with the optical fiber 1 via a multiple fiber-optic coupler, a star coupler. Another possibility for coupling the pump light L1, L2 consists of selecting an optical imaging system, which is made up, for example, of lenses and mirrors. In addition, additional light sources for the production of pump light may be present, whose emission frequencies serve to excite the active laser substance 2 to energy levels that are above a first energy level 9 (FIG. 2), which is located above the upper laser level 10 of the active laser substance 2, in the direction of which a radiation-less transition via phonons takes place. In the case of erbium ions, the energy level 9 corresponds to the term $I_{11/2}$, and the laser level 10 corresponds to the term $I_{13/2}$.

From the laser level 10, the active laser substance 2 passes into the lower laser level 11 either by spontaneous emission $E_{10,11}^{spont}$ or by means of induced emission $E_{10,11}^{ind}$ said laser level 11 corresponding to the ground state $I_{15/2}$ of the erbium ions in this case.

From the lower laser level 11, the laser active substance 2 is converted to the energy level 9 by irradiation of the pump light L1, as a result of absorption $A_{11,9}$.

As a result of the pump light L2, the active laser substance 2 passes from the upper laser level 10, by absorption $A_{10,12}$, into a second energy level 12 which, in this case, corresponds to the term $^2H_{11/2}$ or $^4F_{5/2}$.

By means of spontaneous emission $E_{12,10}^{spont}$, the active laser substance 2 returns from the energy level 12 into the upper laser level 10, and the transition between the energy level 12 and the lower laser level 11 also takes place by spontaneous emission $E_{12,11}^{spont}$. In order to greatly suppress the spontaneous emission $E_{10,11}^{spont}$ as against the induced emission $E_{10,11}^{ind}$, the following conditions must be met:

The absorption $A_{10,12}$ must be greatly predominant over the spontaneous emission $E_{10,11}^{spont}$.

The absorption $A_{10,12}$, in turn, must be very much weaker than the induced emission $E_{10,11}^{ind}$.

In addition, the spontaneous emission $E_{12,11}^{spont}$ must be very much greater than the spontaneous emission $E_{12,10}^{spont}$.

These assumptions apply analogously if pump light of even shorter wavelengths is used to establish even higher energy levels of the active laser substance in addition to the upper energy level 12. In such a case, the interfering spontaneous emission $E_{10,11}^{spont}$ is largely suppressed.

What is claimed is:

1. An optical amplifier for amplifying an optical signal in an optical waveguide doped in at least one region with erbium ($Er^{3+}$) as an active laser substance (2), wherein a first light source (5) is provided for coupling a first pump light into the optical waveguide, and wherein the active laser substance (2) is excitable by the first pump light to a first energy level $^4I_{11/12}$ (9) above an upper laser level $^4I_{13/2}$ (10), characterized in that a second light source (7) is provided for coupling a second pump light into the optical waveguide, with the active laser substance (2) in the optical waveguide being excitable by the second pump light to a second energy level $^2H_{11/2}$ or $^4F_{5/2}$ (12) above the first energy level $^4I_{11/2}$ (9).

2. An optical amplifier as claimed in claim 1, characterized in that it is a fiber amplifier, that the optical waveguide is a first optical fiber (1), and that at least one first fiber-optic coupler (3) is provided for coupling the first and second pump light from at least one second optical fiber (4) into the first optical fiber (1).

3. An optical amplifier as claimed in claim 2, characterized in that the second optical fiber (4) serves to transmit the first pump light, and that, to transmit the second pump light, a third optical fiber (8) is provided which is connected through a second fiber-optic coupler (6) to the second optical fiber (4).

4. An optical amplifier as claimed in claim 2, characterized in that, to transmit the second pump light, a third optical fiber (8) is provided which is connected through an additional fiber-optic coupler to the first optical fiber (1).

5. An optical amplifier as claimed in claim 2, characterized in that a third optical fiber (8) is provided for transmitting the second pump light, and that the first (1), second (4), and third optical fibers (8) are interconnected by a multiport coupler.

6. An optical amplifier as claimed in claim 2, characterized in that additional light sources are provided for generating pump light, with the active laser substance (2) being excitable by said pump light to energy levels above the first energy level $^4I_{11/2}$ (9).

7. An optical amplifier as claimed in claim 2, characterized in that at least one of the two light sources (5, 7) is a laser light source.

8. An optical fiber amplifier for amplifying an optical signal in a first optical fiber (1) doped in at least one region with an active laser substance (2), wherein a first light source (5) is provided for coupling a first pump light into the optical waveguide, and wherein the active laser substance (2) is excitable by the first pump light to a first energy level (9) above an upper laser level (10), characterized in that a second light source (7) is provided for coupling a second pump light into the optical waveguide, with the active laser substance (2) in the optical waveguide being excitable by the second pump light to a second energy level (12) above the first energy level (9), that at least one first fiber-optic coupler (3) is provided for coupling the first and second pump light from at least one second optical fiber (4) into the first optical fiber (1), that the second optical fiber (4) serves to transmit the first pump light, and that, to transmit the second pump light, a third optical fiber (8) is provided which is connected through a second fiber-optic coupler (6) to the second optical fiber (4).

9. An optical fiber amplifier as claimed in claim 8, characterized in that additional light sources are provided for generating pump light, with the active laser substance (2) being excitable by said pump light to energy levels above the first energy level (9).

10. An optical fiber amplifier as claimed in claim 8, characterized in that at least one of the two light sources (5,7) is a laser light source.

11. An optical fiber amplifier for amplifying an optical signal in a first optical fiber (1) doped in at least one region with an active laser substance (2), wherein a first light source (5) is provided for coupling a first pump light into the optical waveguide, and wherein the active laser substance (2) is excitable by the first pump light to a first energy level (9) above an upper laser level (10), characterized in that a second light source (7) is provided for coupling a second pump light into the optical waveguide, with the active laser substance (2) in the optical waveguide being excitable by the second pump light to a second energy level (12) above the first energy level (9), that at least one first fiber-optic coupler (3) is provided for coupling the first and second pump light from at least one second optical fiber (4) into the first optical fiber (1), and that, to transmit the second pump light, a third optical fiber (8) is provided which is connected through an additional fiber-optic coupler to the first optical fiber (1).

12. An optical fiber amplifier as claimed in claim 11, characterized in that additional light sources are provided for generating pump light, with the active laser substance (2) being excitable by said pump light to energy levels above the first energy level (9).

13. An optical fiber amplifier as claimed in claim 11, characterized in that at least one of the two light sources (5,7) is a laser light source.

14. An optical fiber amplifier for amplifying an optical signal in a first optical fiber (1) doped in at least one region with an active laser substance (2), wherein a first light source (5) is provided for coupling a first pump light into the optical waveguide, and wherein the active laser substance (2) is excitable by the first pump light to a first energy level (9) above an upper laser level (10), characterized in that a second light source (7) is provided for coupling a second pump light into the optical waveguide, with the active laser substance (2) in the optical waveguide being excitable by the second pump light to a second energy level (12) above the first energy level (9), that at least one first fiber-optic coupler (3) is provided for coupling the first and second pump light from at least one second optical fiber (4) into the first optical fiber (1), that a third optical fiber (8) is provided for transmitting the second pump light, and that the first (1), second (4), and third (8) optical fibers are interconnected by a multiport coupler.

15. An optical fiber amplifier as claimed in claim 14, characterized in that additional light sources are provided for generating pump light, with the active laser substance (2) being excitable by said pump light to energy levels above the first energy level (9).

16. An optical fiber amplifier as claimed in claim 14, characterized in that at least one of the two light sources (5,7) is a laser light source.

* * * * *

UNITED STATES PATENT AND TRADEMARK OFFICE
CERTIFICATE OF CORRECTION

PATENT NO. : 5,119,230
DATED : June 2, 1992
INVENTOR(S) : Thomas Pfeiffer

It is certified that error appears in the above-identified patent and that said Letters Patent is hereby corrected as shown below:

At column 3, line 45, please change "$^4I_{11/12}$" to --$^4I_{11/2}$--.

Signed and Sealed this

Eighth Day of March, 1994

Attest:

BRUCE LEHMAN

*Attesting Officer*       *Commissioner of Patents and Trademarks*